US006948022B2

(12) United States Patent
Ishibashi

(10) Patent No.: US 6,948,022 B2
(45) Date of Patent: Sep. 20, 2005

(54) DIGITAL IMAGE TRANSFER CONTROLLER

(75) Inventor: Norio Ishibashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 315 days.

(21) Appl. No.: 10/239,330

(22) PCT Filed: Jan. 25, 2002

(86) PCT No.: PCT/JP02/00568

§ 371 (c)(1),
(2), (4) Date: Feb. 5, 2003

(87) PCT Pub. No.: WO02/060175

PCT Pub. Date: Aug. 1, 2002

(65) Prior Publication Data

US 2003/0158978 A1 Aug. 21, 2003

(30) Foreign Application Priority Data

Jan. 25, 2001 (JP) ....................................... 2001-016820
Jan. 26, 2001 (JP) ....................................... 2001-017934

(51) Int. Cl.[7] ......................... G06F 13/14; G06F 15/00; G06T 1/00; G09G 5/38

(52) U.S. Cl. ....................... 710/305; 710/308; 345/204; 345/418

(58) Field of Search ................................. 710/305, 306, 710/308, 313, 22, 62; 345/204, 531, 418, 501, 562; 463/40, 1; 348/514, 46; 701/211; 340/286.01; 370/402; 711/101

(56) References Cited

U.S. PATENT DOCUMENTS 4,891,760 A * 1/1990 Kashiwazaki et al. ...... 701/200
5,576,736 A * 11/1996 Miwa et al. ................ 345/534
5,877,708 A * 3/1999 Hijikata ................. 340/995.19
5,941,968 A * 8/1999 Mergard et al. ............ 710/308
6,557,682 B2 * 5/2003 Imamura ................... 192/48.5

FOREIGN PATENT DOCUMENTS

JP 6-125488 5/1994

OTHER PUBLICATIONS

"Design and implementation of multimedia functional module for digital TV" by Kim et al. (abstract only) Publication Date: Aug. 2004.*

"Video signal generation using a new interfacing technique for computer system" by Maamoun et al. (abstract only) Publication Date: 2004.*

* cited by examiner

*Primary Examiner*—Gopal C. Ray
(74) *Attorney, Agent, or Firm*—Frommer Lawrence & Haug LLP; William S. Frommer; Samuel S. Lee

(57) ABSTRACT

A data transfer device (10) converts the data stream input to it by IEEE 1394 isochronous transmission from an image processing device (20) connected to it into data in a color signal mode adapted to PCI transfer by means of a converter circuit (219), while controlling an address of PCI bridge circuit (216B) as bus master, transmits the image data from the converter circuit (219) to a graphic memory (221) by DMA transmission by way of a PCI bus (215) and writes the data in the graphic memory (221) by means of a graphic control circuit (220). It then reads the image data from the graphic memory (221) by means of the graphic control circuit (220) and transfers the data to an electronic device (30).

11 Claims, 7 Drawing Sheets

DIGITAL IMAGE TRANSFER CONTROLLER

TECHNICAL FIELD

This invention relates to a data transfer device adapted to perform control operations for outputting image data input from an image processing device to an electronic device.

BACKGROUND ART

When displaying an image picked up by a digital camera on the display screen of a monitoring apparatus, it is necessary to convert the data format of the image data of the digital camera into a format adapted to display the image on the screen of the monitoring apparatus. Normally, the data format of the image data of the digital camera is converted by inserting a converter board having a data format converting feature between the digital camera and the monitoring apparatus. Such a converter board can be built in a personal computer, so as to perform a processing operation on the image data transmitted from the digital camera for format conversion and transfer the image data to the monitoring apparatus. With this arrangement, it is possible to provide a system that allows smooth image pickup operations.

FIG. 1 of the accompanying drawings schematically illustrates the circuit configuration of a converter board 110 having such a data format convening feature. Referring to FIG. 1, the converter board 110 is connected to a digital camera adapted to output image data in a format conforming to the IEEE 1394 Standard and comprises a CPU 111, a CPU bus 112, a system ROM 113, a system RAM 114, a PCI bus 115, a PCI bridge circuit 116, a graphic control circuit 117 and a graphic memory 118. An IEEE 1394 control board 120 for controlling data transmission between the converter board 110 and the digital camera (not shown) is also connected to the PCI bus 115.

The CPU 111 controls the component sections of the converter board 110 by way of the CPU bus 112 according to the programs stored in the system ROM 113 and executes various processing operations. The system ROM 113 typically comprises a flash ROM and stores various programs and fixed data necessary for the operations of the CPU 111. The system RAM 114 typically comprises an SDRAM and temporarily stores data necessary for various control operations of the CPU 111. The PCI bus 115 is used for transmitting data between the CPU 111 and peripheral elements. The PCI bridge circuit 116 controls the connection between the PCI bus 115 and the CPU bus 112.

The graphic control circuit 117 writes image data in and reads image data from the graphic memory 118 having a storage area for storing data of a frame on a time division basis, the data originating from the digital camera. In other words, the graphic control circuit receives the data transmitted from the CPU 111 by way of the PCI bridge circuit 116 and the PCI bus 115 and writes the data in the graphic memory 118. The graphic control circuit 117 also reads the image data stored in the graphic memory 118 and transmits them to the monitoring apparatus by way of the connector 119 and a cable (not shown).

The IEEE 1394 control board 120 comprises an IEEE 1394 physical layer control circuit 121, a link control circuit 122 and a PCI bridge circuit 123.

The physical layer control circuit 121 is a so-called PHY chip for controlling IEEE 1394 physical layers and adapted to convert the analog signal input from an IEEE 1394 cable (not shown) by way of the connector 124 into digital data. The link control circuit 122 is a so-called LINK chip for controlling IEEE 1394 link layers and adapted to control the interface between the physical layer control circuit 121 and the PCI bridge circuit 123. The PCI bridge circuit 123 controls the connection of the link control circuit 122 and the PCI bus 115.

For transferring the image data input from the digital camera to the monitoring apparatus by means of the converter board 110, firstly the image data received by the IEEE 1394 control board 120 is taken into the CPU 111 by way of the PCI bridge circuit 123, the PCI bus 115, the PCI bridge circuit 116 and the CPU bus 112 and its format of the image data is converted into the format to be used for displaying an image on the display screen of the monitoring apparatus by means of a processing operation using the software stored in the CPU 111.

The image data whose format is converted by the CPU 111 is then transmitted to the graphic control circuit 117 by way of the CPU bus 112, the PCI bridge circuit 116 and the PCI bus 115 and finally sent to the monitoring apparatus by means of the graphic control circuit 117 and the graphic memory 118.

Meanwhile, when converting the format of the image data by means of the software stored in the CPU 111, the processing operation of the CPU 111 is slow relative to the data transmission rate for IEEE 1394 isochronous data to give rise to a problem of a reduced frame rate for the image to be displayed. Additionally, there is a problem of a reduced processing rate of the entire system because of a lowered operational capacity of the system due to the increased processing load of the CPU 111 caused by the data transmission.

Furthermore, with the above described known converter board, the transmission rate of the image data input from the digital camera and that of the image data transmitted to the monitoring apparatus can be different. In most cases, this difference is caused by the difference between the rate of writing data in and that of reading data from the graphic memory. Therefore, when the image data of a frame is written into and read from the storage area of the graphic memory for a frame and there arises a difference between the rate of writing image data and that of reading image data, there can arise a phenomenon that the lines being read out can outrun the lines being written in. Such a phenomenon can result in line noise (outrun scanning noise) that appear on the image being displayed on the screen of the monitoring apparatus. Particularly, when a moving image is continuously transmitted and displayed on a real time basis, such an outrun scanning noise can periodically occur to degrade the image quality.

The above identified problems need to be dissolved for any systems adapted to transmit image data input from a digital camera to a monitoring apparatus and those adapted to transmit image data input from an image processing device to an electronic device.

DISCLOSURE OF THE INVENTION

In view of the above described circumstances, it is therefore an object of the present invention to provide a data transfer device that can avoid the problem of a reduced frame rate and a reduced operation speed without causing the CPU to bear an excessive load when converting the format of image data of a terminal device such as digital camera into that of image data to be displayed and transmitting the image data to an electronic device such as monitoring apparatus.

Another object of the present invention is to provide a data transfer device that can avoid the problem of generation of outrun scanning noise due to the difference between the rate of writing image data into and that of reading image data from a graphic memory.

In an aspect of the invention, the above objects and other objects are achieved by providing a data transfer device for transferring the image data input from an image processing device to an electronic device, said device comprising: a conversion processing section for performing a predetermined conversion processing operation on the image data input from said image processing device; a graphic memory for temporarily storing the image data; a graphic control circuit for writing the image data transmitted from said conversion processing section to said graphic memory or reading the image data stored in said graphic memory and transmitting it to said electronic device; and a CPU for selecting a first data transmission route for transmitting the image data from said conversion processing section to said graphic control circuit or a second data transmission route for transmitting a control signal to said graphic control circuit; said conversion processing section being adapted to convert the stream of image data input from said image processing device into an output format.

In another aspect of the invention, there is provided a data transfer device for transferring the image date input from an image processing device to an electronic device, said device comprising: a conversion processing section for performing a predetermined conversion processing operation on the image data input from said image processing device; a graphic memory for temporarily storing the image data; a graphic control circuit for writing the image data transmitted from said conversion processing section to said graphic memory or reading the image data stored in said graphic memory and transmitting it to said electronic device, and a CPU for selecting a first data transmission route for transmitting the image data from said conversion processing section to said graphic control circuit or a second data transmission route for transmitting a control signal to said graphic control circuit; said conversion processing section being adapted to convert the stream of image data input from said terminal device into a format suited for displaying the image; said graphic memory having an image data storage area for a plurality of frames; said graphic control circuit being adapted to sequentially select the image data storage area for a plurality of frames and control the operation of writing and reading image data on a time division basis.

BEST MODE FOR CARRYING OUT THE INVENTION

Now, the present invention will be described by referring to the accompanying drawings that illustrate preferred embodiments of the invention.

Figure 1:
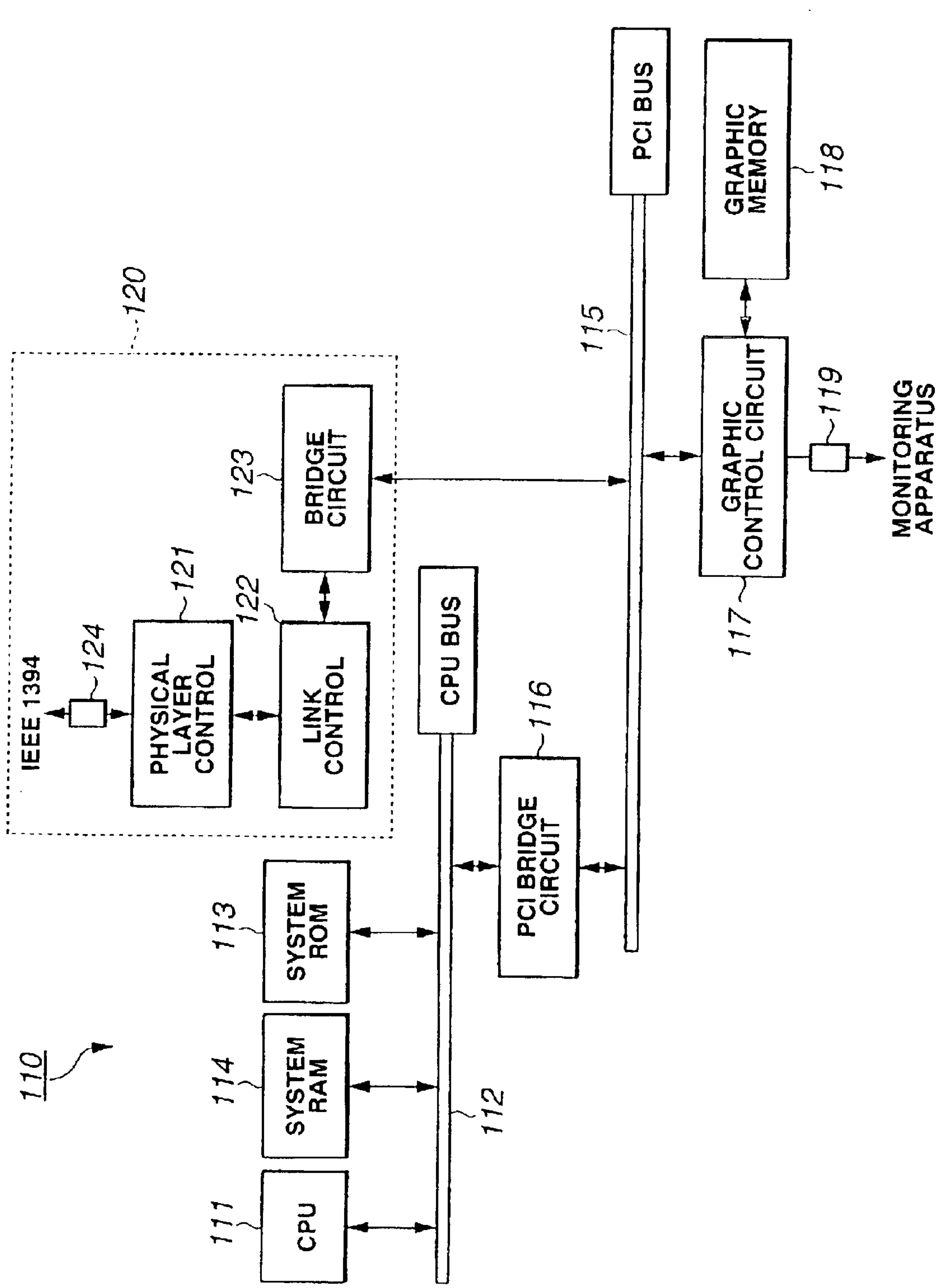
FIG. 1 is a schematic block diagram of a converter board having a functional feature of converting the format of data, illustrating the circuit configuration thereof.
Figure 2:
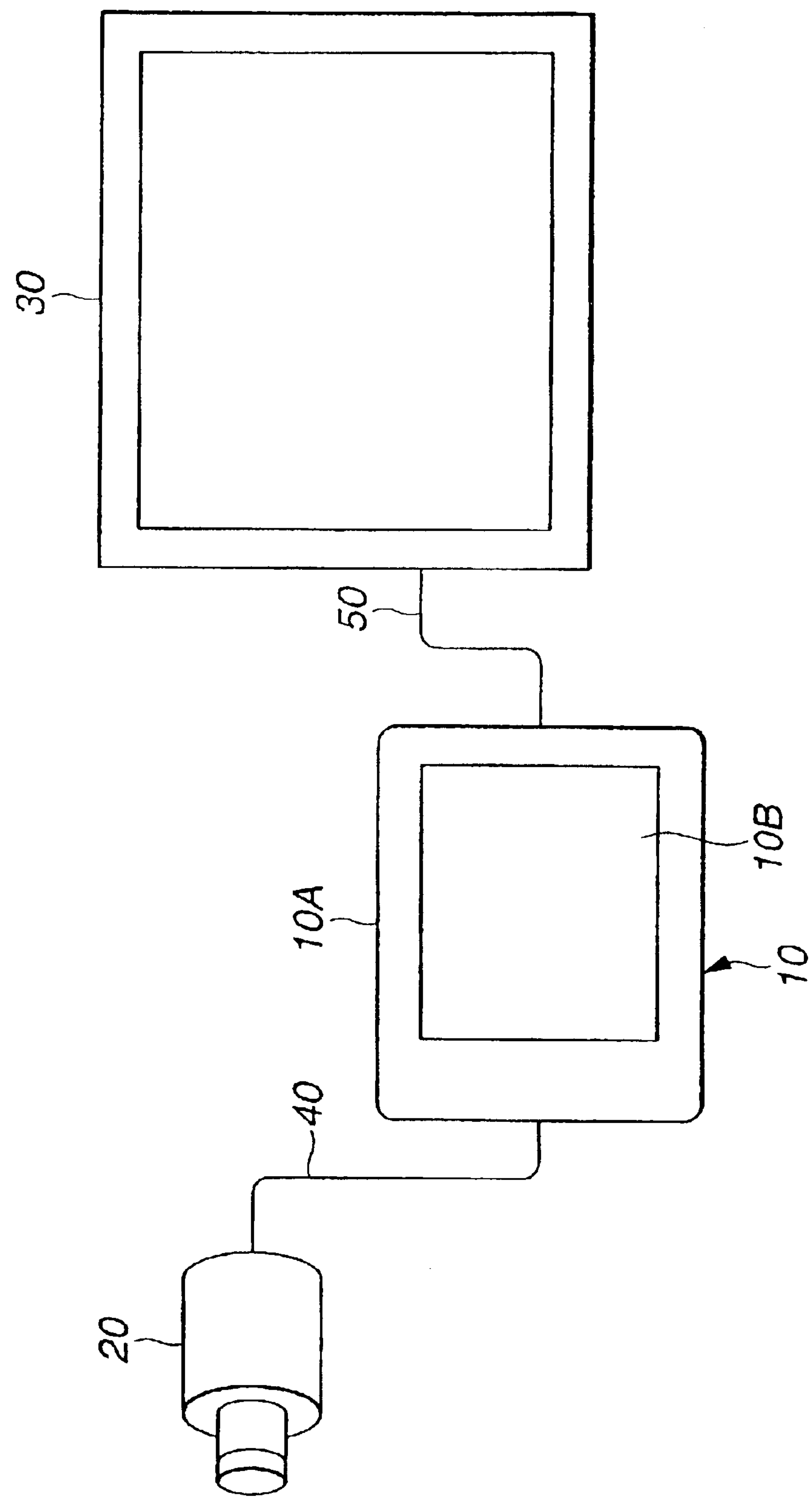
FIG. 2 is a schematic illustration of a digital camera controller connected to a digital camera and a multi-scan monitor.

FIG. 2 is a schematic illustration of a digital camera controller realized by applying the present invention and connected to a digital camera and a multi-scan monitor. As shown in FIG. 2, the digital camera controller 10 is arranged between a digital camera 20 and a multi-scan monitor 30 and adapted to convert the image data transmitted from the digital camera 20 into image data to be used for displaying the image on the multi-scan monitor 30 and output it.

The digital camera controller 10 is provided with a liquid crystal display 10B comprising a liquid crystal display element and arranged on the front surface of the device cabinet 10A.

Note that, in FIG. 2, the digital camera controller 10 and the digital camera 20 are connected to each other by way of a cable conforming to the IEEE 1394 Standard (IEEE 1394 cable) and the digital camera controller 10 and the multi-scan monitor 30 are connected to each other by way of a Dsub15pin cable 50.

The digital camera controller may be connected to a plurality of digital cameras 20 and a plurality of multi-scan monitors 30.

The digital camera 20 is adapted to pick up both still images and moving images. A plurality of resolutions are provided to correspond to available image modes (VGA, SVGA, XGA, SXGA, etc.) and any of the resolutions may be selected for operation. The digital camera 20 outputs image data in a signal format conforming to the IEEE 1394 Standard. The digital camera 20 may be controlled directly by the user operating it or remotely by way of the digital camera controller 10.

A number of sets of parameters are provided for the operation of the multi-scan monitor 30. The image input through the cable 50 is displayed by using a selected set of parameters corresponding to the selected image mode (VGA, SVGA, XGA, SXGA, etc.). The parameters include resolution (image size), frame rate, horizontal frequency and pixel frequency. The multi-scan monitor 30 may be controlled directly by the user operating it or remotely by way of the digital camera controller 10.

Now, the internal configuration of a digital camera controller realized by applying the present invention will be described below.

Figure 3:
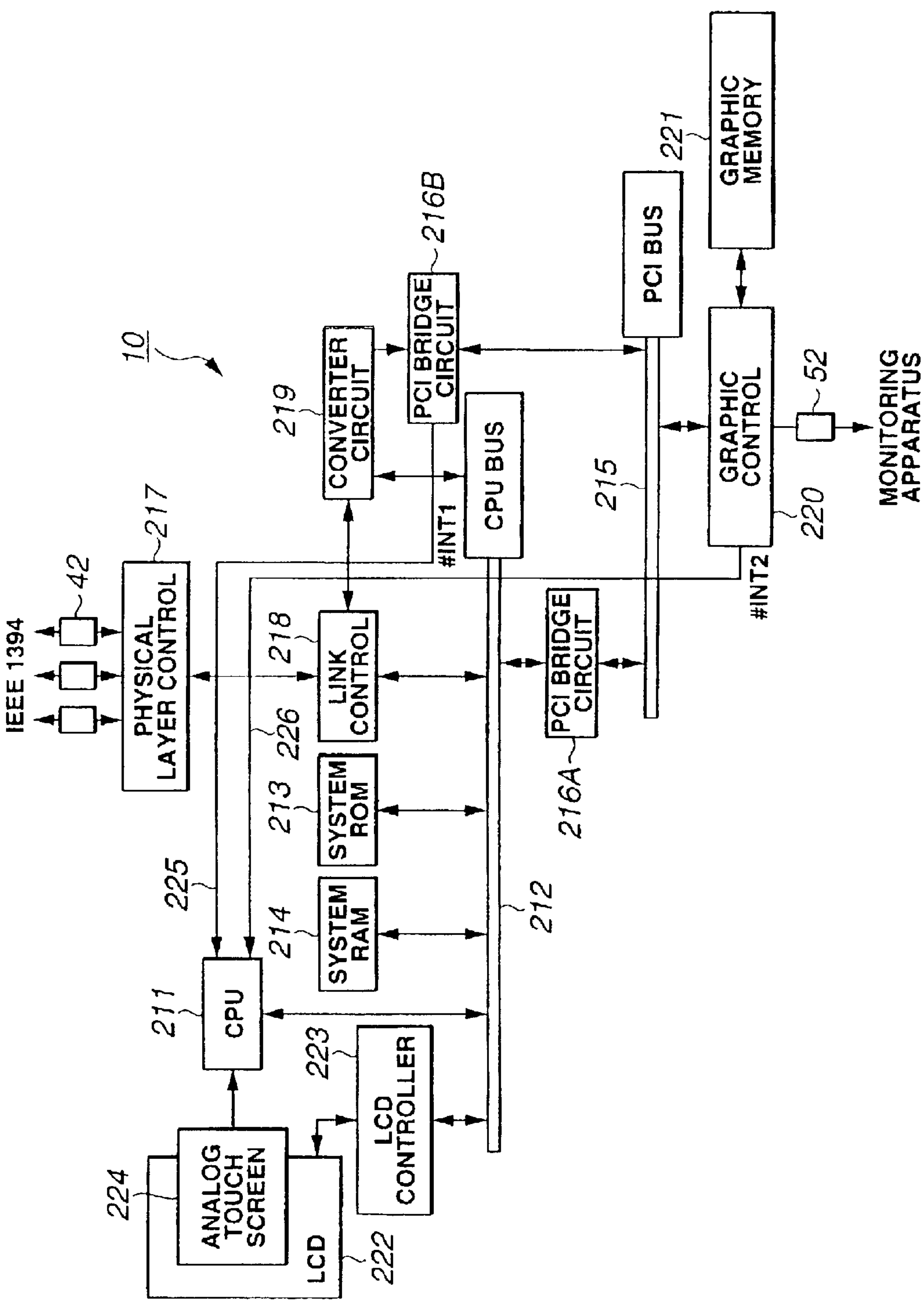
FIG. 3 is a schematic block diagram of a digital camera controller realized by applying the present invention, illustrating the internal configuration thereof.

FIG. 3 is a schematic block diagram of a digital camera controller realized by applying the present invention, illustrating the internal configuration thereof. As shown in FIG. 3, the digital camera controller 10 comprises a CPU 211, a CPU bus 212, a system ROM 213, a system RAM 214, a PCI bus 215, PCI bridge circuits 216A, 216B, a physical layer control circuit 217, a link control circuit 218, a converter circuit 219, a graphic control circuit 220, a graphic memory 221, an LCD 222, an LCD controller 223 and an analog touch screen 224.

The CPU 211 controls the sections of the digital camera controller 10 by way of the CPU bus 212 according to the programs stored in the system ROM 213. The CPU 211 receives interrupt signal #INT1 that indicates the end of an operation of writing the data of a frame (image to be displayed) from the PCI bridge circuit 216B and also interrupt signal #INT2 that indicates the end of an operation of reading the data of a frame from the graphic control circuit 220. The CPU 211 controls operations of writing image data to and reading image data from the graphic memory 221 that are performed by the graphic control circuit 220 according to the received interrupt signals #INT1, #INT2. Interrupt signals #INT1, #INT2 are typically transmitted by way of dedicated interrupt signal lines 225, 226.

The system ROM 213 is typically a flash ROM and stores various programs and fixed data necessary for the operation of the CPU 211. The system RAM 214 is typically an SDRAM and temporarily stores data necessary for various control operations of the CPU 211. The system RAM 214 is provided with a read frame register and a write frame register for storing frame numbers that are used wherein the CPU 211 manages the storage areas to be used for reading image data and those to be used for writing image data of the graphic memory 221 according to the interrupt signals #INT1, #INT2.

The PCI bus 215 is used for transmission of data between the CPU 211 and peripheral elements. The PCI bus 215 can transmit data streams by means of isochronous transfer (realtime data) conforming to the IEEE 1394 Standard.

The PCI bridge circuit 216A is a device for controlling the connection between the PCI bus 215 and the CPU bus 212. The PCI bridge circuit 216B is a device for transmitting the image data input from the converter circuit 219 to the graphic control circuit 220 by way of the PCI bus 215. Each time the PCI bridge circuit 216B transmits the image data of a frame to the graphic control circuit 220, it outputs an interrupt signal #INT1 that indicates the end of an operation of writing the data of a frame to the graphic memory 221 to the CPU 211. The PCI bridge circuit 216B has a data counter (not shown) to be used for outputting the interrupt signal #INT1. The PCI bridge circuit 216B may replace the graphic control circuit 220 and perform the operation of writing image data to the graphic memory 221. For this purpose, the PCI bridge circuit 216B has a function of selecting a write address for writing image data to the graphic memory 221 and transmitting image data to the graphic memory 221. Thus, with the system configuration of FIG. 3, graphic processing operations are controlled by the PCI bridge circuit 216B and the graphic control circuit 220.

The physical layer control circuit 217 is a so-called PHY chip for controlling physical layers defined by the IEEE 1394 Standard and converts the analog data input from the IEEE 1394 cable 40 by way of the connector 42 into digital data. The link control circuit 218 is a so-called LINK chip for controlling link layers defined by the IEEE 1394 Standard. It controls the interface between the physical layer control circuit 217 and the CPU 211 and the interface between the physical layer control circuit 217 and the converter circuit 219. The converter circuit 219 converts the format of the image data transmitted from the digital camera 20 into that of image data suited for displaying the image.

The graphic memory 221 is a memory for temporarily storing the image data transmitted by way of the PCI bus 215 and has storage areas for three frames (multi-frame area) of the multi-scan monitor 30. Hereinafter, the storage areas for three frames are referred to as first frame storage area, second frame storage area and third frame storage area respectively.

The graphic control circuit 220 receives the image data transmitted from the digital camera 20 by way of the connector 42, the physical layer control circuit 217, the link control circuit 218 and the converter circuit 219 and also through the PCI bridge circuit 216B and the PCI bus 215. The graphic control circuit 220 receives the control data transmitted from the CPU 211 through the CPU bus 212, the PCI bridge circuit 216A and the PCI bus 215. The graphic control circuit 220 writes the received image data into the graphic memory 221. It also reads image data stored in the graphic memory 221 and transmits the data to the monitor 30 by way of the connector 52 and the cable 50. The graphic control circuit 220 has a read data counter (not shown) to be used for outputting interrupt signal #INT2 that indicates the end of an operation of reading out the data of a frame to the CPU 211.

The LCD 222 displays various pieces of information on the LCD display screen 10B under the control of the CPU 211. The LCD controller 223 controls the display operation of the LCD 222.

The analog touch screen 224 is arranged on the display screen 10B of the LCD 222 and operates as touch panel to be used for detecting the user operation that is performed in response to the contents displayed on the LCD 222.

There are two routes for transmitting image data and control data to the graphic control circuit 220 as described below. The first data transmission route is used to transfer the image data input by way of the connector 42 to the graphic control circuit 220 through the physical layer control circuit 217, the link control circuit 218, the converter circuit 219, the PCI bridge circuit 216B and the PCI bus 215. The second data transmission route is used to temporarily take in the image data that are input by way of the connector 42 to the CPU 211 (system RAM 214) by way of the physical layer control circuit 217, the link control circuit 218 and the CPU bus 212 and transfer the data to the graphic control circuit 220 by way of the CPU bus 212, the PCI bridge circuit 216A and the PCI bus 215.

The digital camera controller 10 transmits the image data normally through the first data transmission route so as to alleviate the load of the CPU 211. The digital camera controller may use the second data transmission route for transferring the image data processed by the CPU 211 to the graphic control circuit 220 and writing the data into the graphic memory 221 or inversely for reading the image data stored in the graphic memory 221 to the CPU 211 by way of the graphic control circuit 220. The control data from the CPU 211 are input to the graphic control circuit 220 by way of the second data transmission route.

Figure 4:
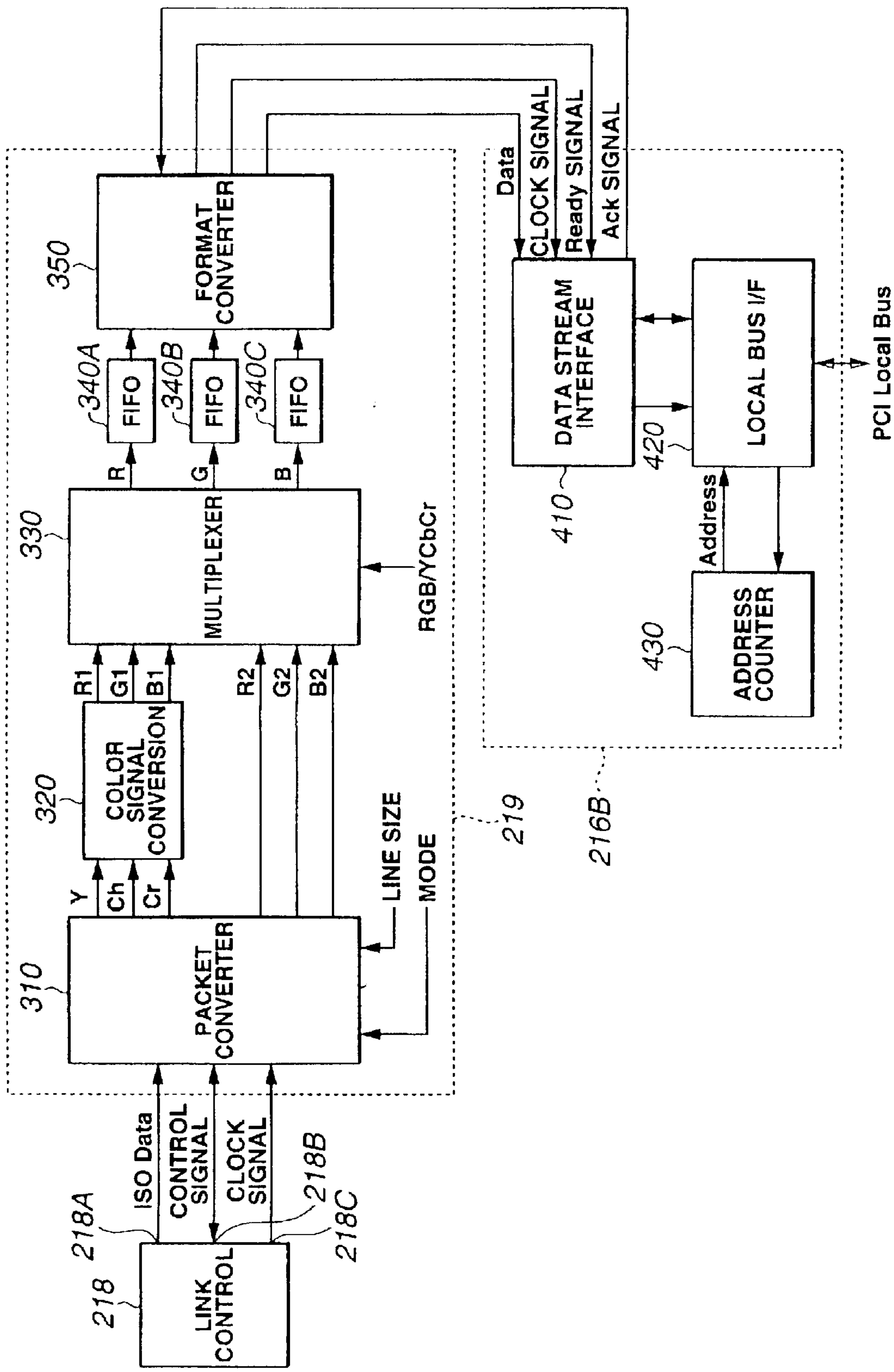
FIG. 4 is a schematic block diagram of a converter circuit and a PCI bridge circuit arranged in the digital camera controller, illustrating the configurations thereof.

FIG. 4 is a schematic block diagram of the converter circuit 219 and the PCI bridge circuit 216B of the digital camera controller 10 of this embodiment, illustrating the configuration thereof.

Referring to FIG. 4, the link control circuit 218 outputs IEEE 1394 isochronous data (ISO data) from data output terminal 218A that is independent from the interface of the CPU 211. More specifically, the link control circuit 218 outputs isochronous data from the data output terminal 218A in synchronism with clock signal CLK from clock output terminal 218C and supplies the data to the converter circuit 219.

Transmission/reception of control signals takes place between the control terminal 218B and the converter circuit 219. The control signal contains a signal synchronized with the leading packet of a frame of image data and a signal indicating effective data (image itself) in the packet.

The converter circuit 219 comprises a packet converter 310, a color signal conversion (YCbCr→RGB) circuit 320, a multiplexer 330, FIFO buffers 340A, 340B, 340C and a PCI format converter 350.

Data on the format corresponding to the image pickup mode and the pixel size of the digital camera 20 are written in advance in the converter circuit 219 by the CPU 211 along with other data.

The packet converter 310 comprises a line size register and a mode register (not shown) as internal registers. These internal registers are made to store data on line size and mode in advance by the CPU 211.

The packet converter 310 receives control signals from the link control circuit 218. The packet converter 310 resets the converter circuit 219 and detects the leading packet of a frame according to the signal synchronized with the leading packet of the frame and contained in the received control signal. Additionally, the packet converter 310 performs a processing operation corresponding to the line size data stored in the line size register and the mode data (indicating the color signal format) stored in the mode register according to the signal indicating the effective data in the packet and contained in the control signal.

Specific conversion processing methods are predefined for the modes including 8-bit Mono, YCbCr 4:1:1, YCbCr 4:2:2, YCbCr 4:4:4 and RGB, the data of which are stored in the mode register. For example, for each of the modes of YCbCr 4:1:1, YCbCr 4:2:2 and YCbCr 4:4:4, CbCr is converted to YCbCr 4:4:4 by linear interpolation and the obtained signals are transmitted to the color signal conversion (YCbCr→RGB) circuit 320, which converts the signals into RGB signals. As a result, color signals R1, G1, B1 are output from the color signal conversion circuit 320 to the multiplexer 330. On the other hand, Y=R=G=B is used for the 8-bit Mono mode, whereas color signals R2, G2, B2 are output from the packet converter 310 to the multiplexer 330 without any conversion in the RGB mode.

The line size register stores the number of pixels of a line (line size) for the purpose of processing the tail end of each line.

The multiplexer 330 selects color signals R1,G1, B1 coming from the color signal conversion circuit 320 in each of the modes of YCbCr 4:1:1, YCbCr 4:2:2 and YCbCr 4:4:4. In the 8-bit Mono mode or the RGB mode, the multiplexer 330 selects color signals R2, G2, B2 coming from the packet converter 310. Then, the multiplexer 330 outputs the selected color signals to the FIFO buffers 340A, 340B, 340C as output signals R, G, B.

The FIFO buffers 340A, 340B, 340C take a role of absorbing the difference between the transfer rate of isochronous data from the digital camera 20 and the PCI transfer rate. The data of the FIFO buffers 340A, 340B, 340C are sequentially output to the PCI format converter 350.

The PCI format converter 350 converts the 8-bit RGB data (data of a total of 24 bits) into a data of 32 bits to be used for PCI transfer. The 32-bit data obtained by the conversion is transferred to the PCI bridge circuit 216 in synchronism with the clock.

The PCI bridge circuit 216B comprises a data stream interface 410, a PCI local bus interface 420 and a PCI address counter section 430.

The data stream interface 410 receives a data stream of clock signal CLK and image data from the converter circuit 219 and controls the interface between the converter circuit 219 by means of handshake of Ready signal and ACK signal. Note that the above described data stream is formed by causing the isochronous data transfer rate and the PCI transfer rate to match each other by means of handshake of Ready signal and ACK signal.

The PCI local bus interface 420 receives as input the data stream and the clock signal CLK that are received by the data stream interface 410. Then, the PCI local bus interface 420 transmits the data stream to the PCI bus 215 according to the clock signal CLK.

The PCI address counter section 430 controls the address to be used for transferring the data stream by way of the PCI bus 215. The PCI address counter section 430 also controls the address to be used for writing the data stream in a predetermined area of the graphic memory 221 by way of the graphic control circuit 220.

More specifically, for controlling the DMA transmission, the PCI bridge circuit 216B takes the role of so-called PCI master, while the graphic control circuit 220 plays the part of so-called PCI slave.

Note that, when the operation of writing data for a frame in an operation of writing a data stream in the graphic memory 221 without resorting to software, the next image data needs to be overwritten on the same area of the graphic memory 221 from the leading address. The PCI address counter section 430 performs the address control operation for overwriting the image data. The PCI address counter section 430 comprises a total number of DMA data register for storing the total number of image data of a frame, a DMA data counter (down counter) for counting DMA data, a PCI address counter for counting PCI addresses and a start address register for storing the start address, or the leading address, of the predetermined storage area.

When the DMA data counter counts down and the reading of the counter becomes equal to "0", the PCI address counter section 430 presets the DMA data counter and the PCI address counter, using the respective registered values of the total number of DMA data register and the start address register.

Then, the PCI address counter section 430 decrements (−1) the DMA data counter and increments (+1) the PCI address counter each time a unit data (32 bits (4 bytes)) is output from the PCI bridge circuit 216B. The address value counted by the PCI address counter is output to the PCI bus 215. The graphic control circuit 220 writes the image data in the predetermined storage area of the graphic memory 221 by using the address value.

With the above described hardware arrangement, the circuit elements of the converter circuit 219 and the PCI bridge circuit 216B are initialized each time an image data of a frame is transferred so that it is possible to automatically write image data in the predetermined respective storage areas without resorting to software.

Then, the image data are read out from the storage areas storing the image data by means of the graphic control circuit 220 and subjected to necessary processing operations such as D/A conversion within the graphic control circuit 220 before they are output to the multi-scan monitor 30 by way of the cable 50. As a result, the image taken by the IEEE 1394 camera can be displayed automatically at the frame rate of the selected mode.

Since conversion-related processing operations are conducted in this way by means of hardware according to the invention, it is now possible to carry out the operations at high speed if compared with processing operations that are carried out by the CPU 211 using software. Therefore, the present invention easily accommodates high speed data streams and provides an improved processing capacity.

Thus, the digital camera controller 10 realized by applying the present invention converts the data stream input from the digital camera 20 by IEEE 1394 isochronous transfer of the converter circuit 219 into image data frames to be used for PCI transmission and the image data frames are then transferred to the graphic control circuit 220 by DMA transfer of the PCI bridge circuit 216B. With this arrangement, the processing operation for transmitting image data is conducted at high speed and the entire system is made to show a high processing capacity. In other words, the digital camera controller 10 realized by applying the present invention uses the PCI bus 215 as extension bus and controls the DMA transmission by using the PCI bridge circuit 216 as bus master. Once a DMA transmission is started, the CPU 211 is released from the operation of transmitting image data and hence can perform other processing operations by way of the CPU bus 212. As a result, the load of the CPU 211 is reduced to improve the efficiency of operation of the entire system.

Now, the operation of the graphic control circuit 220 of the digital camera controller 10 realized by applying the present invention will be discussed below in detail.

Note that the first, second and third frame storage areas of the graphic memory 221 are provided respectively with frame numbers 1, 2 and 3.

Figure 5:
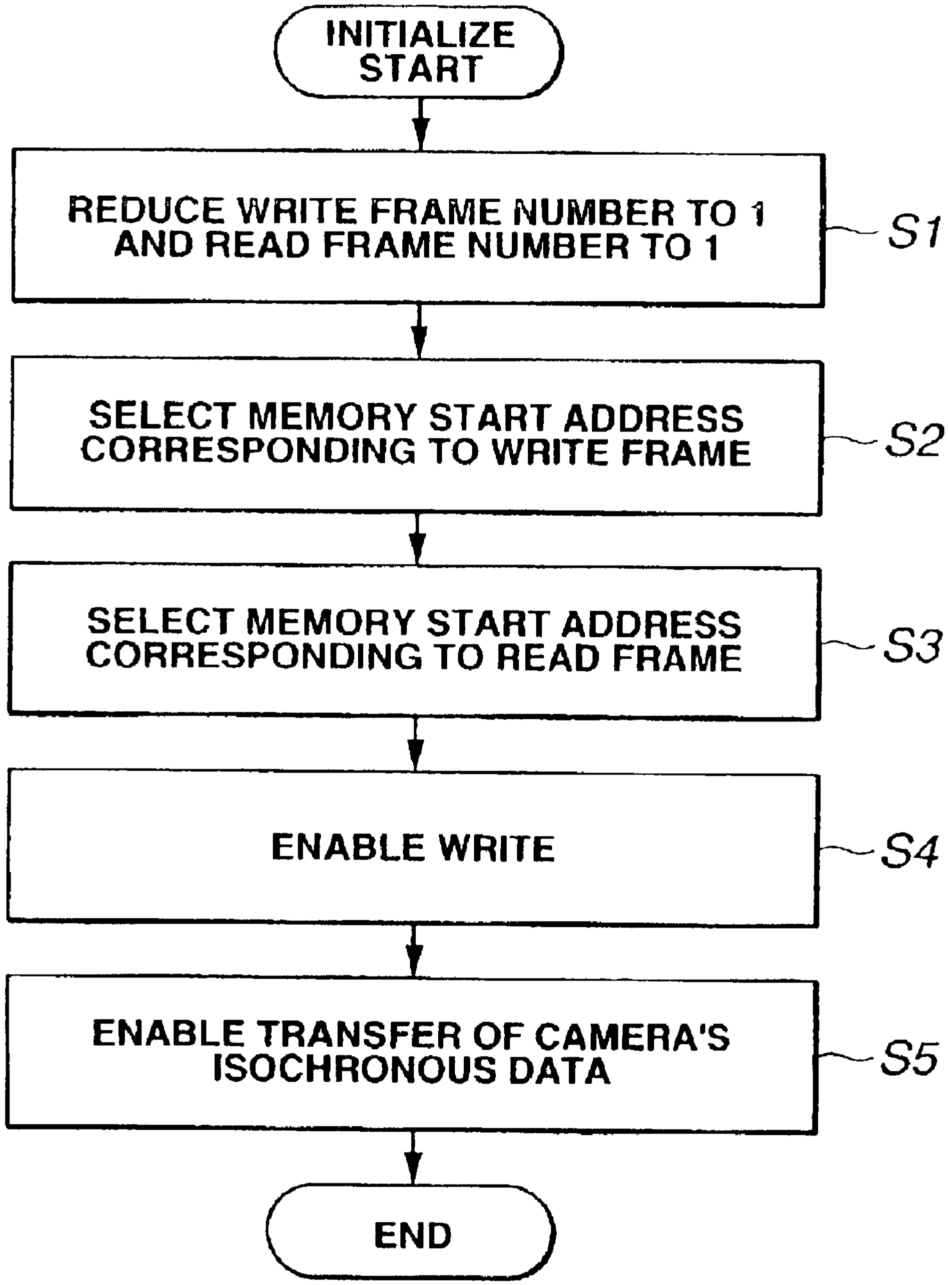
FIG. 5 is a flow chart of the start of a data writing operation of the digital camera controller.

FIG. 5 is a flow chart of the start of an image data writing operation of the CPU 211. Firstly, in Step S1, the CPU 211 initializes the read frame register and the write frame register of the system RAM 214 by storing frame number 1 there.

Then, the CPU 211 selects the memory start address that corresponds to the write frame for the PCI bridge circuit 216B by way of the CPU bus 212, the PCI bridge circuit 216A and the PCI bus 215 (Step S2). Thereafter, the CPU 211 selects the memory start address that corresponds to the read frame for the graphic control circuit 220 by way of the CPU bus 212, the PCI bridge 216A and the PCI bus 215 (Step S3). Note that the memory start address indicates the leading address of each frame storage area (the first frame storage area here) of the graphic memory 221.

Subsequently, the CPU 211 initializes (enables) the converter circuit 219 and the link control circuit 218 by way the CPU bus 212 for the purpose of writing data and, at the same time, it initializes the PCI bridge circuit 216B by way of the CPU bus 212 and the converter circuit 219, and also the graphic control circuit 220 by way of the CPU bus 212, the PCI bridge circuit 216A and the PCI bus 215 (Step S4). Thereafter, the CPU 211 permits (enables) isochronous data transfer of the digital camera 20 (Step S5). At this time, the number of data of a frame is set in the write data counter of the PCI bridge circuit 216B and the counter value is decremented (−1) thereafter each time an image data is transferred. Detection signal #INT1 is output to the CPU 211 when the counter value becomes equal to 0. With this arrangement, the PCI bridge circuit 216B operates as bus master independently from the CPU 211.

Figure 6:
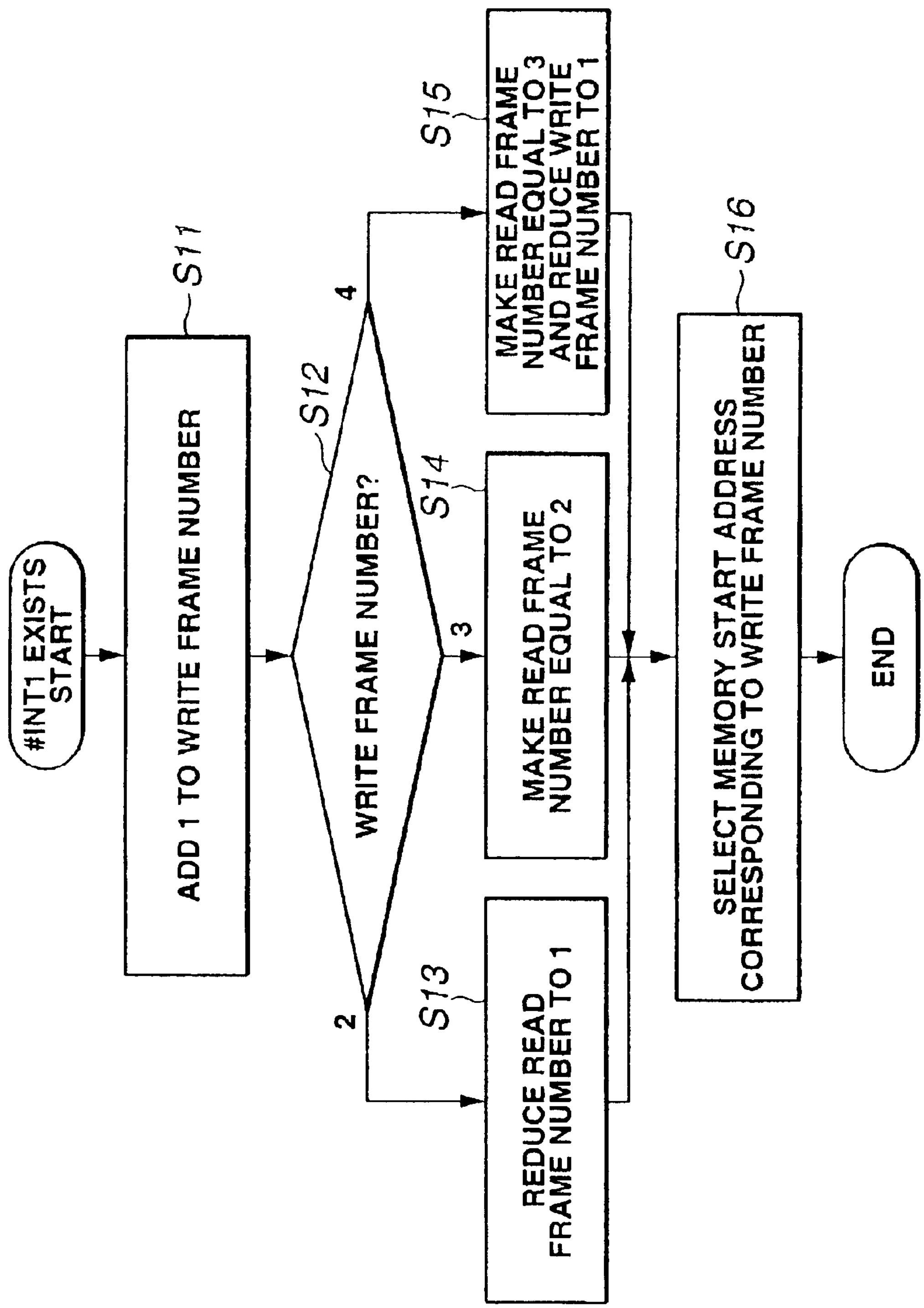
FIG. 6 is a flow chart of an interrupt processing operation of the CPU when the CPU detects detection signal #INT1.

FIG. 6 is a flow chart of an interrupt processing operation of the CPU 211 when it detects detection signal #INT1.

Referring to FIG. 6, in this interrupt processing operation, the CPU 211 firstly adds 1 to the write frame number (Step S11) and finds out the write frame number after the addition (Step S12). If the CPU 211 finds that the write frame number is equal to 2, it reduce the read frame number to 1 (Step S13), whereas it makes the read frame number equal to 2 if the write frame number is equal to 3 (Step S14) but makes the read frame number equal to 3 and reduces the write frame number to 1 if the write frame number is equal to 4 (Step S15). Then, in Step S16, the CPU 211 provides the PCI bridge circuit 216B with the memory start address that corresponds to the read frame number after the addition or the write frame number reduced to 1 and moves out of the interrupt processing operation. As a result, the write frame storage area is switched and an operation of writing image data in a new area starts.

Figure 7:
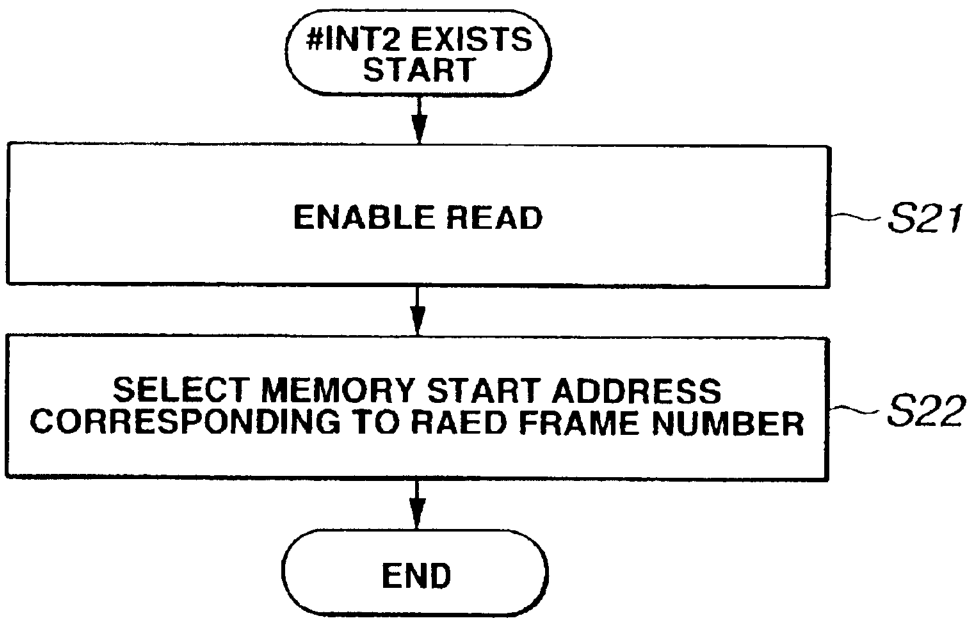
FIG. 7 is a flow chart of an interrupt processing operation of the CPU when the CPU detects detection signal #INT2.

FIG. 7 is a flow chart of an interrupt processing operation of the CPU 211 when it detects detection signal #INT2.

Referring to FIG. 7, in this interrupt processing operation, the CPU 211 firstly enables the graphic control circuit 220 to perform a read operation by way of the CPU bus 212, the PCI bridge circuit 216A and the PCI bus 215 (Step S21). Then, the CPU 211 provides the graphic control circuit 220 with the memory start address that corresponds to the read frame number by way of the CPU bus 212, the PCI bridge circuit 216A and the PCI bus 215 (Step S22) to start an operation of reading data from the graphic memory 221.

As shown in FIG. 6, the digital controller 10 realized by applying the present invention appropriately switches the write frame storage area according to the read frame number and conducts a processing operation in the sequence shown in FIG. 7 so that a frame storage area that is not being used for any write operation is selected as frame storage area to be used for reading image data. Thus, generation of outrun scanning noise is prevented from taking place.

Additionally, the workload of the CPU 211 can be alleviated because the PCI bridge circuit 216B can carry out the transfer processing operation for which the CPU 211 is normally responsible as it takes the role of bus master.

It will be appreciated that the scope of application of the present invention is not limited to the above described embodiment of digital camera controller 10.

While the digital camera controller is adapted to transfer the image data input from a digital camera to a multi-scan monitor in the above description, the present invention is applicable to various data transfer devices adapted to transfer the image data input from an image processing device to an electronic device.

While storage areas for three frames are provided in the graphic memory in the above description (if M frame storage areas are provided and image data is written in the N-th frame, M=3 and N=1, 2, 3 in the above description) in the above description, it is also possible to control in a similar manner if storage areas for two frames or four or more than four frames are provided.

While the PCI bridge circuit 216B is provided with the read address control function for image data stored in the graphic memory 221 in the above description, the graphic control circuit 220 may alternatively be provided with such a function.

While a multi-scan monitor 30 is used as monitoring apparatus for displaying images in the above description, it may be replaced by some other monitoring apparatus or an electronic device that can change the resolution (image size) according to the external input.

Finally, while a PCI bus is used as extension bus and made to operate as bus master for the purpose of controlling DMA transmissions in the above description, a bus other than PCI bus may be selected as extension bus.

What is claimed is:

1. A data transfer device for transferring the image data input from an image processing device to an electronic device, said device comprising:

a conversion processing section for performing a predetermined conversion processing operation on the image data input from said image processing device;

a graphic memory for temporarily storing the image data;

a graphic control circuit for writing the image data transmitted from said conversion processing section into said graphic memory or reading the image data stored in said graphic memory and transmitting it to said electronic device; and a CPU for selecting a first data transmission route for transmitting the image data from said conversion processing section to said graphic control circuit or a second data transmission route for transmitting a control signal to said graphic control circuit; said conversion processing section being adapted to convert the image data input from said image processing device into an output format, wherein said CPU is provided with a CPU bus for controlling the component sections, an extension bus for connecting itself to peripheral elements including said graphic control circuit and a bus bridge circuit for control said extension bus; and said bus bridge circuit controls said extension bus as bus master and controls DMA transmissions of transmitting image data from said conversion processing section to said graphic control circuit.

2. The device according to claim 1, wherein said extension bus is a PCI bus and said bus bridge circuit is a PCI bridge circuit.

3. The device according to claim 1, wherein said bus bridge circuit operating as bus master for controlling DMA transmissions includes an interface section for controlling the interface between the converter circuit and the extension bus and an address management section for managing the address of the image data being transmitted.

4. A data transfer device for transferring the image data input from an image processing device to an electronic device, said device comprising:

a conversion processing section for performing a predetermined conversion processing operation on the image data input from said image processing device;

a graphic memory for temporarily storing the image data;

a graphic control circuit for writing the image data transmitted from said conversion processing section into said graphic memory or reading the image data stored in said graphic memory and transmitting it to said electronic device; and a CPU for selecting a first data transmission route for transmitting the image data from said conversion processing section to said graphic control circuit or a second data transmission route for transmitting a control signal to said graphic control circuit; said conversion processing section being adapted to convert the image data input from said image processing device into an output format.

wherein said conversion processing section includes a color signal format conversion section for converting the format of the image data transferred from said image processing device into a color signal format suited for displaying images and a transfer format conversion section for converting the format of the data converted by said color signal format conversion section further into a data format suited for data transfer, and wherein said color signal format conversion section includes a plurality of conversion processing sections adapted to perform different respective conversion processing operations corresponding to the color signal formats of image processing devices and a selection section for selecting one of said plurality of conversion processing sections according to the color signal format of said image processing device and outputting the output data of said selected conversion processing section to said transfer format conversion section.

5. A data transfer device for transferring the image data input from an image processing device to an electronic device, said device comprising:

a conversion processing section for performing a predetermined conversion processing operation on the image data input from said image processing device;

a graphic memory for temporarily storing the image data;

a graphic control circuit for writing the image data transmitted from said conversion processing section into said graphic memory or reading the image data stored in said graphic memory and transmitting it to said electronic device; and a CPU for selecting a first data transmission route for transmitting the image data from said conversion processing section to said graphic control circuit or a second data transmission route for transmitting a control signal to said graphic control circuit; said conversion processing section being adapted to convert the image data input from said image processing device into an output format, wherein said conversion processing section includes a color signal format conversion section for converting the format of the image data transferred from said image processing device into a color signal format suited for displaying images and a transfer format conversion section for converting the format of the data converted by said color signal format conversion section further into a data format suited for data transfer, and wherein a buffer section is provided between said color signal format conversion section and said transfer format conversion section in order to absorb the difference of the transfer rate of the image processing device and that of the graphic control circuit.

6. A data transfer device for transferring the image data input from an image processing device to an electronic device, said device comprising:

a conversion processing section for performing a predetermined conversion processing operation on the image data input from said image processing device;

a graphic memory for temporarily storing the image data;

a graphic control circuit for writing the image data transmitted from said conversion processing section into said graphic memory or reading the image data stored in said graphic memory and transmitting it to said electronic device; and a CPU for selecting a first data transmission route for transmitting the image data from said conversion processing section to said graphic control circuit or a second data transmission route for transmitting a control signal to said graphic control circuit; said conversion processing section being adapted to convert the image data input from said image processing device into an output format, wherein said graphic memory has image data storage areas for a plurality of frames and said graphic control circuit sequentially selects the image data storage areas for the plurality of frames and controls image data write operations and image data read operations on a time division basis.

7. The device according to claim 6, wherein said CPU judges the storage area where an image data is being written and determines the storage area to be used for reading an image data on the basis of its judgment.

8. The device according to claim 7, wherein said CPU detects that the image data of a frame has been written in said graphic memory and that the image data of a frame has been read out from said graphic memory and switches the storage area for writing image data and the storage area for reading image data according to the detection signals from said write timing detection circuit and said read timing detection circuit.

9. The device according to claim 8, wherein said graphic memory has M frame storage areas, each being adapted to store the image data of a frame, and said graphic control circuit switches to the N+1-th frame storage area to write the image data of the N+1-th frame after writing the image data in the storage area for the N-th frame ($N \leqq M$, N, M: positive integer) and also switches to the N-th frame storage area to read the image data of the N-th frame after reading the image data in the storage area for the N−1-th frame.

10. The device according to claim 6, wherein said image data are real time moving image data.

11. The device according to claim 6, wherein said image data are adapted to be converted into a data stream of a predetermined format before being transmitted.

* * * * *